Patented May 7, 1940

2,199,813

UNITED STATES PATENT OFFICE 2,199,813

AMINOANTHRAQUINONES

Fritz Baumann and Heinz-Werner Schwechten, Leverkusen, and Artur Krause and Robert Zell, Ludwigshafen-on-the-Rhine, Germany, assignors to General Aniline & Film Corporation, a corporation of Delaware No Drawing. Application December 17, 1937, Serial No. 180,318. In Germany December 23, 1936

3 Claims. (Cl. 260—379)

The present invention relates to aminoanthraquinones.

We have found that new valuable aminoanthraquinones are obtained by causing amines of the general constitution

(in which $R_1$ stands for an alkyl group having at least three carbon atoms and containing at least two hydroxyl groups and $R_2$ for hydrogen or an alkyl, aralkyl or aryl group or an alkyl group containing at least two hydroxyl groups) either alone or in admixture with each other or in admixture with a mono-hydroxy-alkylamine to act on anthraquinone derivatives of the general constitution

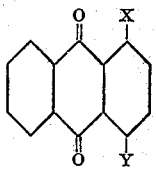

(in which X stands for H, OH, $NH_2$ or an alkylamine radical having at least two carbon atoms and containing at least one hydroxyl group, Y for OH, $NH_2$, halogen, $NO_2$ or an alkoxy or aryloxy group and in which the anthraquinone nucleus may contain any other atoms or groups) or on their leuco compounds, if desired in admixture with the said anthraquinone derivatives, and if desired oxidizing the leuco compounds thus first formed.

As amines of the said kind there may be mentioned for example 1-amino-2,3-dihydroxypropane, glucamine, alkylaminosorbitols and other amines of the sugar series having a corresponding structure.

As suitable anthraquinone derivatives there may be mentioned for example 1-halogenanthraquinones, 1-nitro-anthraquinones, 1-amino-4-methoxyanthraquinones, 1-amino-4-halogenanthraquinones, 1-hydroxyethylamino-4-halogenanthraquinones and 1-amino-4-halogenanthraquinone-2-sulphonic acids. As suitable leuco compounds there may be mentioned for example leuco-1.4-dihydroxyanthraquinone, leuco-1-amino-4-hydroxyanthraquinone, leuco-1,4-diaminoanthraquinone and leuco-1,4,5,8-tetrahydroxyanthraquinone.

In many cases it is not necessary to start with the ready-made leuco compounds, but the corresponding anthraquinone derivatives may also be used in the presence of a reducing agent, such as zinc dust or sodium hydrosulphite (if desired in an amount insufficient for the formation of the leuco compounds).

The compounds obtainable according to this invention are generally speaking dyestuffs with which dyeings of high clarity and good fastness may be produced on cellulose esters and ethers. A special advantage lies in their good solubility in water, so that dyeing from aqueous baths may frequently be carried out without the addition of dispersing or wetting agents or other dyeing assistants. The compounds, in the form of the sulphuric esters, may also be used as acid wool dyestuffs.

The following examples will further illustrate how the said invention may be carried out in practice but the invention is not restricted to these examples. The parts are by weight.

Example 1

A suspension of 5 parts of 1-nitroanthraquinone in a solution of 10 parts of 1-amino-2,3-propanediol in 40 parts of pyridine is stirred at from 90° to 95° C. until initial material can no longer be detected. The mixture is then diluted with hot water, filtered and the filtrate, which may if desired be still further diluted with water, allowed to cool. The 1-propanediolaminoanthraquinone thus formed separates in red needles. It dissolves well in boiling water giving a red coloration. Its solution in 90 per cent sulphuric acid is yellow-red in color; it changes to red upon heating. The compound yields powerful scarlet red dyeings on acetate artificial silk.

Example 2

A mixture of 5 parts of 1-methoxy-4-nitro-anthraquinone and 20 parts of 1-amino-2,3-propanediol is heated to from 110° to 115° C. while stirring well until unchanged initial material can no longer be detected. For the purpose of separating the 1-amino-4-propanediolaminoanthraquinone formed, 100 parts of 50 per cent aqueous alcohol are added to the reaction mixture, the whole filtered and the new compound salted out. It is obtained in a well-crystallized form and dissolves in hot water with a blue-violet coloration. Its solution in hot 96 per cent sulphuric acid has a red color which changes rapidly into a greenish blue upon the addition of trioxymethylene. The new compound gives clear, reddish blue dyeings of good fastness on acetate artificial silk.

Example 3

A mixture of 12 parts of 1,4-dihydroxyanthraquinone, 18 parts of 1-amino-2,3-propanediol, 12 parts of sodium hydrosulphite and 100 parts of methanol is boiled under reflux while stirring until no 1,4-dihydroxyanthraquinone can be detected in a sample withdrawn and oxidized. After cooling, the leuco compound of 1,4-di-(propanediolamino)-anthraquinone thus obtained is filtered off by suction, washed and dried. It may be oxidized to the anthraquinone derivative by known methods, as for example by heating with nitrobenzene in the presence of piperidine. The 1,4-di-(propanediolamino)-anthraquinone dissolves readily in warm water giving a blue coloration. Its solution in sulphuric acid has a bluish red color. On cellulose ethers or esters it yields very fast blue dyeings.

If the aminopropanediol be replaced by glucamine, a water-soluble, blue acetate artificial silk dyestuff is also obtained.

Example 4

A mixture of 24 parts of 1,4-dihydroxyanthraquinone, 6 parts of leuco-1,4-dihydroxyanthraquinone and 160 parts of isobutanol is stirred at 60° C. while a mixture of 13.6 parts of 1-amino-2,3-propanediol and 9.2 parts of aminoethanol is added. The mixture is then stirred for 2 hours at the said temperature, then heated to boiling and boiled under reflux while stirring until 1,4-dihydroxyanthraquinone can no longer be detected in a withdrawn sample. In order to oxidize small amounts of leuco compound, air is led through the mixture; it is freed from isobutanol by means of steam, whereby the major portion of the compound formed passes into solution with a blue coloration.

After adding animal carbon, small amounts of undissolved constituents are filtered off and the compound formed is salted out with common salt from the deep blue mother liquor after the addition of a little caustic soda solution. It consists of a mixture of mainly 1-propanediolamino-4-ethanolaminoanthraquinone, and a small amount of 1,4-dipropanediolaminoanthraquinone while the water-insoluble 1,4-di-(ethanolamino)-anthraquinone also formed in small amounts is separated as the water-insoluble constituent by filtration of the aqueous solution.

The blue powder thus obtained dissolves in sulphuric acid giving a bluish red coloration. It dissolves in warm water giving a deep-blue coloration and yields powerful blue dyeings of excellent fastness on cellulose ethers and esters.

Example 5

A mixture of 14 parts of leuco-1,4,5,8-tetrahydroxyanthraquinone, 18 parts of 1-amino-2,3-propanediol and 100 parts of butanol is heated to boiling under reflux until initial material is no longer present. The compound formed, which partly separates out even while hot, is filtered off by suction after cooling, washed with methanol and dried. It may be oxidized to 1,4-di-(propanediolamino)-5,8-dihydroxyanthraquinone by heating with nitrobenzene in the presence of piperidine as described in Example 3. The said compound is soluble in water giving a blue-green coloration and dyes cellulose ethers and esters very fast blue-green shades. Its solution in sulphuric acid is bluish red in color.

The compound obtainable in the same way from glucamine and leuco-1,4,5,8-tetrahydroxyanthraquinone is also soluble in water and blue-green in color. It may be used for dyeing acetate artificial silk.

Example 6

A mixture of 12 parts of 1-amino-2,3-propanediol and 8 parts of aminoethanol is added to a suspension of 28 parts of leuco-1,4,5,8-tetrahydroxyanthraquinone in 200 parts of isobutanol and the mixture heated to boiling under reflux until initial material can no longer be detected. After cooling, the separated crystals are filtered off by suction, washed with methanol, dried and then oxidized to the anthraquinone derivative with piperidine and nitrobenzene in known manner. The portion of the resulting substance which is soluble in the aqueous layer in the then following treatment with steam is freed from small amounts of water-insoluble 1,4-diethanolamino-5,8-dihydroxyanthraquinone simultaneously formed and separated from the deep blue-green filtrate by salting out. It consists mainly of 1-propanediolamino-4-ethanolamino-5,8-dihydroxyanthraquinone and a small amount of 1,4-dipropanediolamino-5,8-dihydroxyanthraquinone. It is a blue powder which dissolves in warm water giving a blue-green coloration and yields powerful blue-green dyeings of excellent fastness on cellulose ethers and esters.

What we claim is:

1. An anthraquinone derivative of the general formula

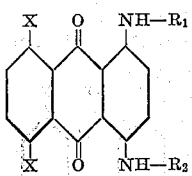

wherein $R_1$ stands for a monohydroxyalkyl group and $R_2$ for a polyhydroxyalkyl group, and wherein X stands for a member selected from the class consisting of hydrogen and the hydroxyl group.

2. The anthraquinone derivative of the formula

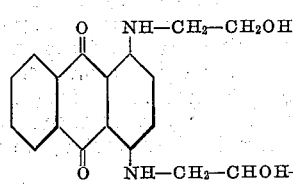

3. The anthraquinone derivative of the formula

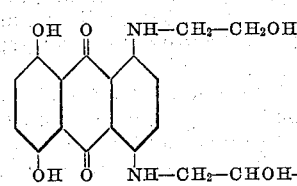

FRITZ BAUMANN.
ARTUR KRAUSE.
HEINZ-WERNER SCHWECHTEN.
ROBERT ZELL.